(12) United States Patent
Harutyunyan (10) Patent No.: US 12,346,765 B2
(45) Date of Patent: Jul. 1, 2025

(54) ENERGY STORAGE DEVICE WITH WIRELESS OPERANDO MONITORING

(71) Applicant: Honda Motor Co., Ltd., Tokyo (JP)

(72) Inventor: Avetik Harutyunyan, Santa Clara, CA (US)

(73) Assignee: Honda Motor Co., LTD, Tokyo (JP)

( * ) Notice: Subject to any disclaimer, the term of this patent is extended or adjusted under 35 U.S.C. 154(b) by 249 days.

(21) Appl. No.: 17/479,978

(22) Filed: Sep. 20, 2021

(65) Prior Publication Data

US 2023/0088932 A1  Mar. 23, 2023

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ................ G06K 7/10366; G06K 19/0723
USPC .......................................................... 235/451
See application file for complete search history.

(56) References Cited

U.S. PATENT DOCUMENTS

| | | | |
|---|---|---|---|
| 2006/0263255 A1* | 11/2006 | Han | B82Y 30/00 422/83 |
| 2007/0138010 A1* | 6/2007 | Ajayan | G01L 1/005 427/112 |
| 2016/0084911 A1* | 3/2016 | Mensah-Brown | G01R 31/392 324/426 |
| 2017/0267530 A1 | 9/2017 | Harutyunyan et al. | |
| 2017/0271652 A1 | 9/2017 | Harutyunyan et al. | |
| 2018/0342729 A1 | 11/2018 | Harutyunyan et al. | |
| 2019/0036102 A1 | 1/2019 | Pierce et al. | |
| 2019/0036103 A1 | 1/2019 | Pierce et al. | |
| 2019/0088925 A1 | 3/2019 | Harutyunyan et al. | |

(Continued)

FOREIGN PATENT DOCUMENTS

WO    2021016319 A1    1/2021

OTHER PUBLICATIONS

C.P. Grey et al., Sustainability and in situ monitoring in battery development, Nature Materials, vol. 16, Jan. 2017, pp. 45-56.

(Continued)

*Primary Examiner* — Michael G Lee
*Assistant Examiner* — David Tardif
(74) *Attorney, Agent, or Firm* — Patterson + Sheridan, LLP (57) ABSTRACT

The present disclosure generally relates to apparatus and processes for wirelessly monitoring the structural health of an energy storage device, and more specifically to energy storage devices with wireless operando monitoring and processes of use. In an aspect, an apparatus for wireless monitoring of an energy storage device is provided. The apparatus includes an energy storage device comprising an electrode, the electrode comprising a nanotube network; a radio-frequency identification (RFID) system comprising: a RFID tag comprising a conductive material, the RFID tag attached to, or embedded within, the electrode; and a RFID reader external to the energy storage device. The apparatus further includes a processor configured to determine a first value of current of the electrode of the energy storage device based on an induced magnetic field acting on the conductive material, and compare the first value of current to a threshold value or range.

28 Claims, 5 Drawing Sheets

(56) References Cited

U.S. PATENT DOCUMENTS

| | | |
|---|---|---|
| 2019/0088929 A1 | 3/2019 | Harutyunyan et al. |
| 2020/0083560 A1* | 3/2020 | Harutyunyan .... H01M 10/0431 |
| 2020/0239317 A1 | 7/2020 | Harutyunyan |
| 2020/0243807 A1 | 7/2020 | Harutyunyan |
| 2020/0243808 A1 | 7/2020 | Harutyunyan et al. |
| 2020/0259160 A1 | 8/2020 | Pierce et al. |
| 2020/0376982 A1* | 12/2020 | Heatley ................. H02J 7/0068 |
| 2021/0020914 A1 | 1/2021 | Harutyunyan |
| 2021/0104721 A1 | 4/2021 | Harutyunyan et al. |
| 2021/0167364 A1 | 6/2021 | Harutyunyan et al. |

OTHER PUBLICATIONS

Fulvio Michelis, et al.. Wireless Flexible Strain Sensor Based on Carbon Nanotube Piezoresistive Networks for Embedded Measurement of Strain in Concrete. Le Cam, Vincent and Mevel, Laurent and Schoefs, Franck. EWSHM—7th European Workshop on Structural Health Monitoring, Jul. 2014, Nantes, France.

\* cited by examiner

ENERGY STORAGE DEVICE WITH WIRELESS OPERANDO MONITORING

FIELD

The present disclosure generally relates to apparatus and processes for wireless monitoring of the structural health of an energy storage device, and more specifically to energy storage devices with wireless operando monitoring and processes of use.

BACKGROUND

Recent advances in electric vehicle technologies, flexible electronics, smart wearable devices, and internet of things (IoT) devices have boosted demand for energy storage devices such as batteries. With this increased demand came concerns around the environmental impact, safety, and sustainability of energy storage devices. Increasing battery lifetime and the manufacture of more structurally resilient energy storage devices would help assuage these concerns.

Therefore, there is a need for methods and apparatus for monitoring the structural health of energy storage devices.

SUMMARY

The present disclosure generally relates to apparatus and processes for wireless monitoring of the structural health of an energy storage device, and more specifically to energy storage devices with wireless operando monitoring and processes of use.

In an aspect, an apparatus for wireless monitoring of an energy storage device is provided. The apparatus includes an energy storage device comprising an electrode, the electrode comprising a nanotube network; a radio-frequency identification (RFID) system comprising: a RFID tag comprising a conductive material, the RFID tag attached to the electrode or embedded within the electrode; and a RFID reader external to the energy storage device. The apparatus further includes one or more processors, wherein at least one processor is configured to determine a first value of current of the electrode of the energy storage device based on an induced magnetic field acting on the conductive material, and compare the first value of current to a threshold value or range.

In another aspect, a process for wirelessly monitoring structural health of an energy storage device is provided. The process includes analyzing data from an RFID system coupled to an electrode of the energy storage device, the electrode comprising a nanotube network, the RFID system comprising: a RFID tag comprising a conductive material, the RFID tag attached to the electrode or embedded within the electrode; and a RFID reader external to the energy storage device. The processes further include determining an action based on the data, and transmitting a signal transmit to an article electrically coupled to the energy storage device or to a user for the article or the user to perform the action.

In another aspect is provided a non-transitory computer-readable medium storing instructions that, when executed on a processor, perform operations for wirelessly monitoring structural health of an energy storage device. The operations include analyzing data from an RFID system coupled to an electrode of the energy storage device, the electrode comprising a nanotube network, the RFID system comprising: a RFID tag comprising a conductive material, the RFID tag attached to the electrode or embedded within the electrode; and a RFID reader external to the energy storage device. The operations further include determining an action based on the data, and transmitting a signal transmit to an article electrically coupled to the energy storage device or to a user for the article or the user to perform the action.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

The present disclosure generally relates to apparatus and processes for wireless monitoring of the structural health of an energy storage device, and more specifically to energy storage devices with wireless operando monitoring and processes of use. The inventors have found apparatus and processes for wireless, in operando monitoring and/or in situ monitoring of the structural health of an energy storage device, e.g., a battery or capacitor, and/or components thereof such as an electrode. The structural health of the energy storage device can be remotely monitored or measured by, e.g., radio-frequency identification (RFID). In some examples, an RFID reader is external to the energy storage device and an RFID tag is attached to, or embedded in, the energy storage device. In some examples, the RFID reader is inductively coupled to the RFID tag. In some examples, embodiments described herein can be utilized for wireless monitoring of the structural health of energy storage devices that, e.g., will not interfere with the device design and performance.

Briefly, and in some examples, the structure to be monitored, e.g., an electrode, includes a nanotube network. The nanotube network, as part of the structure to be monitored, can be capable of stress, strain, bending, or otherwise deforming in response to a stimulus, thereby indicating that, e.g., damage or other change in the electrode has formed. These mechanical changes in the nanotube and/or nanotube network also change the electrical properties of the nanotube network, such as electrical resistivity, known as a piezoresistive effect. Such electrical properties can be monitored as described herein in order to, e.g., monitor the structural health of an electrode. This nanotube network is directly and/or indirectly coupled to the RFID tag. The structural changes of the electrode, can then be monitored by wirelessly or remotely reading a signal from the RFID reader.

Monitoring the structural health of energy storage devices and components thereof (e.g., electrodes), which are subject to fatigue, stress-strain, and corrosion, is valuable in many industries in order to reduce operating costs while maintaining high standards of safety. Detecting structural damage as it forms during the operational life of energy storage devices and electrodes can be difficult, however, particularly when the damage is under a surface. In addition, the lack in ability to monitor damage real-time leaves the energy storage devices and electrodes, as well as neighboring (physically or electrically) structures, subject to extensive damage. Embodiments described herein solve these and other problems by, e.g., exploiting electromechanical properties of nanotube networks embedded within one or more electrodes of the energy storage device. The effect of the change in electrical properties of nanotube network when exposed to a stimulus or force can assist in determining changes in the electrode during its operational life as well as changes over time due to damage to the electrode. By monitoring damage, the stress on the electrode as well as failure of the electrode can be monitored.

Certain aspects of the present disclosure can enable early detection and/or real-time detection of damage as they form in energy storage devices and electrodes. Such early and/or real-time detection enables more efficient scheduling of maintenance and repairs, and can avert problems that may go unnoticed. The detection and monitoring also provides information to engineers on how to manufacture structurally durable energy storage devices and electrodes. In addition, aspects of the present disclosure can enable detection of structural damage during the operational life of the electrode, or a component thereof, before the damage can propagate and cause damage to the electrode and/or nearby components or structures. Although certain aspects of the present disclosure are described with reference to batteries, the apparatus and processes can extend to other energy storage devices such as capacitors and supercapacitors.

In at least one aspect, and as described below, the nanotube network is embedded within an electrode to be monitored. In the absence of strain where the nanotube network has no force or stimuli acting on it, the nanotube network possess a certain electrical resistance. When the electrode to be monitored becomes damaged, the nanotube network stresses, bends, strains, or otherwise deforms. This change in the nanotube network causes the nanotube network to rearrange by changing their alignments and contact points, and thereby causing an electrical resistance change of the electrode. The change in electrical resistance can be detected as, e.g., a change in electrical characteristic (e.g., current, current change, potential, potential change, etc.), and can be indicative of the change of health (e.g., loss of health or damage) of the electrode.

For example, if a stimuli or force is applied to the electrode, and the electrode experiences damage as a result, the resistance of the nanotube network, and consequently the resistance of the electrode, will vary according to Gauge Factor to that damage rate or occurrence. Such information can be part of a baseline for understanding the routine stress that the electrode experiences. If the electrode experiences permanent damage, then the variation of resistance can also permanently change and be indicative of the health of the electrode. Damage refers to any change to the electrode material and/or geometric properties of a component (e.g., an electrode), including deformations, degradations, defects, cracks, flaws, fractures, detachments, delaminations, corrosion damage, weaknesses, and/or any other change in condition of an electrode. Such damage can be caused by a stimulus or force. Non-limiting examples of a stimulus or force can include electric, temperature, pressure, strain, stress, applied force, gravitational force, normal force, friction force, air resistance force, tension force, or spring force.

Figure 1:
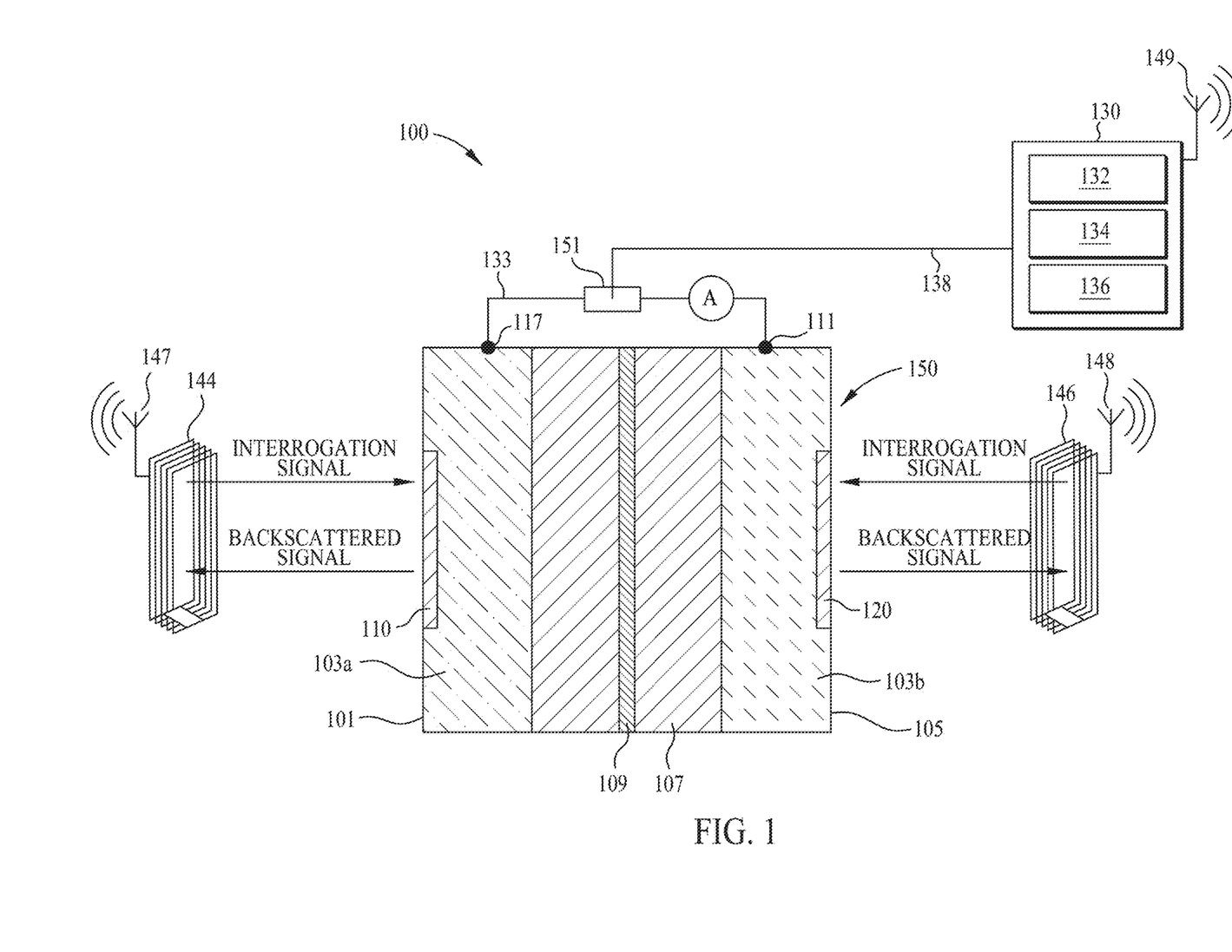
FIG. 1 is an illustration of an example apparatus for wirelessly monitoring the health of an energy storage device.

FIG. 1 is an illustration of an example apparatus 100 for wirelessly monitoring the health of an energy storage device. Monitoring of a current, potential, or other electrical characteristic along one or more electrodes (anode and cathode) can be performed, e.g., in operando and/or in situ, and any change or deviation in the current, potential, or other electrical characteristic can indicate structural changes in the electrode.

Aspects enable monitoring of the structural health (e.g., damage) of an electrode of the energy storage device. The electrode can be part of any suitable energy storage device such as a battery (e.g. a lithium ion battery, sodium-sulfur battery, redox flow battery, fuel battery), a capacitor, or a supercapacitor (e.g. an electrochemical double layer capacitor or pseudocapacitor). In this example, the electrode to be monitored is part of a battery 150. The battery 150 includes a cathode 101, an anode 105, a separator 109 positioned between the cathode 101 and the anode 105, and an electrolyte 107. In at least one aspect, the battery 150 is, or includes electrodes that are free of current collectors, binders, and/or additives as disclosed in U.S. Pat. No. 10,658, 651, which is hereby incorporated by reference in its entirety. Such electrodes are, e.g., bendable, stretchable, and/or twistable. The electrodes can be self-standing electrodes for, e.g., lithium ion batteries. Embodiments described herein are applicable to foil-free electrodes where carbon nanotubes replace, e.g., Cu and/or Al foil of the electrodes.

In the illustrative, but non-limiting, embodiment of FIG. 1, the cathode 101 and the anode 105 are the components to be monitored for damage. However, it is contemplated that only the cathode 101 or only the anode 105 can be the component to be monitored. The cathode 101 includes a nanotube network 103a. The nanotube network is made of, e.g., a plurality of nanotubes. The nanotube network 103a can be part of, or be otherwise embedded within, a composite material that forms at least a portion of the cathode 101. The anode 105 includes a nanotube network 103b. The nanotube network 103b can be part of, or be otherwise embedded within, a composite material that forms at least a portion of the anode 105. In this example, although both the cathode 101 and the anode 105 include a nanotube network, it is contemplated that the cathode 101 is the only electrode that includes a nanotube network or the anode 105 is the only electrode that includes a nanotube network. That is, one or both electrodes can be the component to be monitored. As discussed below the composite material that forms at least a portion of the cathode and/or anode includes a nanotube network. In some aspects, a nanotube concentration in the composite material is about 0.5 wt % or more and/or about 10 wt % or less. Higher or lower concentrations are contemplated. In at least one embodiment, one or both of the electrodes (cathode and/or anode) includes a lithium storage active material.

Figure 2A:
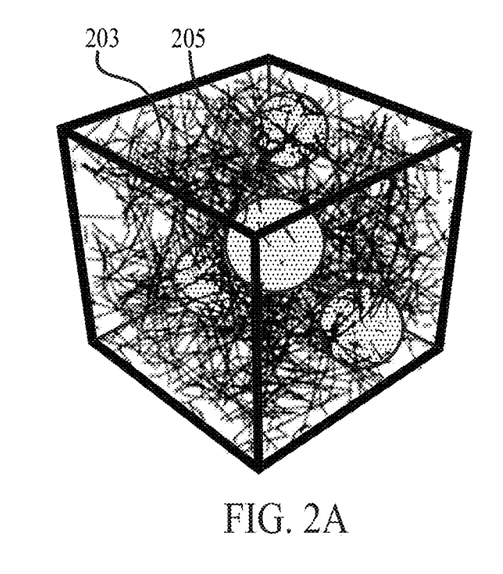
FIGS. 2A, 2B, and 2C illustrate a three-dimensional nanotube network in two states of stress according to at least one aspect of the present disclosure.
Figure 2B:
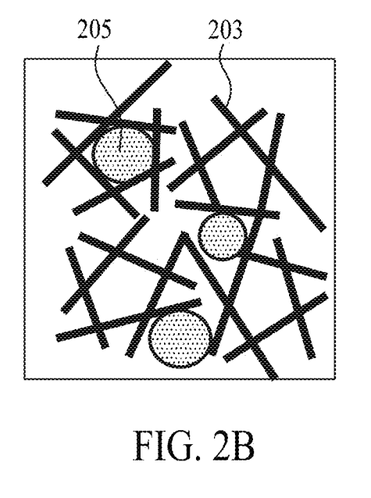
Figure 2C:
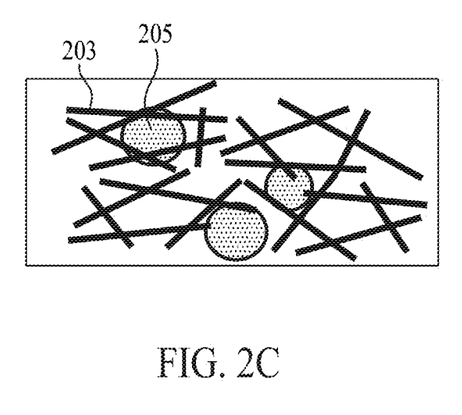

FIGS. 2A-2C illustrate an electrode having a three-dimensional nanotube network in two states of stress according to at least one aspect of the present disclosure. The electrode includes a nanotube network 203 and an active battery material 205. FIG. 2A shows a three-dimensional view of the electrode under no stress. FIG. 2B, which is a slice or two-dimensional view of the electrode of FIG. 2A, also shows the electrode under no stress. FIG. 2C shows a slice or two-dimensional view of the electrode under stress. In FIGS. 2A-2C, damage to the electrode to be monitored causes the nanotube network 203 to stress, bend, strain, or otherwise deform. As a result, the resistance of the electrode changes and such resistance can be monitored or detected, by e.g., monitoring changes in current.

The observed piezoresistive effect is a result of, e.g., the rearrangement of the nanotube network under mechanical impact (strain). The electrode (e.g., a self-standing sheet) will change its resistance if there is formation of any damage in the electrode during battery lifetime. The insight of this network resistance change is the rearrangement of the three-dimensional microstructure of the nanotube network that leads to the sliding of nanotubes relative to each other and thereby changing the number of the contacts between them. Since the overall sheet resistance is defined by the nanotube/nanotube contact resistance, changes of the nanotube/nanotube contacts in the network lead to the sheet resistance changes. Damage is one cause that can lead to the rearrangement and thereby the resistance changes.

Referring back to FIG. 1, an anode contact 111 is positioned on the anode 105, and a cathode contact 117 is positioned on the cathode 101. The anode contact 111 and the cathode contact 117 can be made of any suitable material such as Al, Cu, Ni, alloys thereof, or combinations thereof. In operation, and as an example, the anode contact 111 and the cathode contact 117 can be used for measurements powering an article 151, such as an energy consuming device, such as an automobile, a motor, consumer electronic, LED, components thereof, etc.

An RFID system, which includes RFID tag(s) and RFID reader(s), is coupled to the energy storage device. For example, a first RFID tag 110 is attached to, or embedded in, the cathode 101. A second RFID tag 120 is attached to, or embedded in, the anode 105. The apparatus shown in FIG. 1 further includes a first RFID reader 144 and a second RFID reader 146. The first RFID reader 144 and the second RFID reader 146 are external to the electrodes. The RFID readers 144, 146 are radio frequency transmitters and receivers that can read and write information to the RFID tags 110 and 120, respectively. As an example, during wireless monitoring of the health of the cathode 101, the first RFID reader 144 can send an interrogation signal to the first RFID tag 110 of the cathode 101, and the first RFID reader 144 can receive information as, e.g., a backscattered signal, from the first RFID tag 110. The information sent and received corresponds to, e.g., an electrical characteristic (e.g., a current, voltage, changes thereof, combinations thereof, etc.) of the cathode 101. For example, the current going through the cathode 101 induces a magnetic field in a portion of the first RFID tag 110 which can be read by, or sent to, the first RFID reader 144. Because the magnetic field induced in the portion of the first RFID tag 110 corresponds to the current going through the cathode 101, the health of the battery can be monitored by monitoring the current (or other electrical characteristic).

Similarly, during wireless monitoring of the health of the anode 105, the second RFID reader 146 can send an interrogation signal to the second RFID tag 120 of the anode 105, and the second RFID reader 146 can receive information as, e.g., a backscattered signal, from the second RFID tag 120. The information sent and received corresponds to, e.g., an electrical characteristic (e.g., a current, voltage, changes thereof, combinations thereof, etc.) of the anode 105. For example, the current going through the anode 105 induces a magnetic field in a portion of the second RFID tag 120 which can be read by, or sent to, the second RFID reader 146. Because the magnetic field induced in the portion of the second RFID tag 120 corresponds to the current going through the anode 105, the health of the battery can be monitored by monitoring the current (or other electrical characteristic).

In FIG. 1, A represents an ammeter. A controller 130 can be electrically coupled to the article 151 via wire 138. The controller 130 can also be electrically coupled to the ammeter A by a wire (not shown). In some aspects, the ammeter A is part of the controller 130 instead of a separate element. The controller 130 can be configured to control one or more operations for monitoring the structural health of the battery 150. The controller 130 can also be configured to send and receive signals from the first RFID reader 144 and/or the second RFID reader 146 via, e.g., one or more transmitters and/or antennas located with the RFID readers 144, 146 and/or the controller 130. An antenna or transmitter for the first RFID reader 144, the second RFID reader 146, and the controller 130 are shown in FIG. 1 as antennas 147, 148, and 149, respectively. In some aspects, the antennas 147, 148, and 149 can be included within one or more of the first RFID reader 144, the second RFID reader 146, and the controller 130, respectively. In some aspects, antennas are located on or in the RFID tag(s) 110, 120 to send and receive signals from antennas 147/148 of the RFID reader(s) 144, 146.

The selection of which electrode is to be monitored (e.g., the cathode 101, the anode 105, or both), determines whether the first RFID tag 110, the second RFID tag 120, or both, are utilized as well as whether the first RFID reader 144, the second RFID reader 146, or both, are utilized. For example, if the cathode 101 is the component to be monitored, the apparatus 100 can be free of the second RFID tag 120 and the second RFID reader 146. As another example, if the anode 105 is the component to be monitored, the apparatus 100 can be free of the first RFID tag 110 and the first RFID reader 144. However, the RFID tags 110, 120 and the RFID readers 144, 146 can be part of the apparatus 100 whether or not the individual electrode it is used with is being monitored.

In operation, and as further discussed below, the controller 130 can be configured to monitor, measure, and/or detect a characteristic of the energy storage device, such as a potential, a potential change, a current, a current change, a resistance, and/or a resistance change. For example, the controller 130 can be configured to monitor a current or a change in current along the anode and/or cathode. A specific current or a change in current can indicate a change in the health of battery 150. Measurements can be performed when the battery 150 is electrically connected to the article 151 or not electrically connected to the article 151. Although not shown in the apparatus 100, equipment for noise filtering, signal amplifying, pulsing, and/or other equipment can be used with the apparatus 100 to provide, e.g., accuracy and sensitivity for measurements and calculations.

In addition, the sensitivity of the device can be increased by the properties of the RFID tag(s) 110, 120 and/or RFID reader(s) 144, 146. As described below, the RFID tag(s) 110, 120 can be made of or include, a metal, a metal alloy, a carbon nanotube, graphene or combinations thereof. The metal, metal alloy, carbon nanotube, graphene or combinations thereof can be in the form of a yarn or thread configured as coils. The number of coils of the yarn or thread can affect the sensitivity such that a higher number of coils leads to higher sensitivity. As also described below, the RFID reader(s) 144, 146 can be made of or include a conductive material such as a metal and/or a metal alloy. The metal and/or metal alloy of the RFID reader(s) can be in the form of a yarn or thread configured as coils, e.g., a conductive yarn or thread. The number of coils of the conductive yarn or thread can affect the sensitivity such that a higher number of coils leads to higher sensitivity.

The controller 130 includes at least one processor 132, a memory 134, and support circuits 136. The at least one processor 132 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The controller 130 can be configured to, e.g., detect or sense a change in current of one or more of the electrodes (e.g., the cathode 101, anode 105, or both). Briefly, this can be accomplished by, e.g., the RFID reader(s) 144, 146 sending an interrogation signal to the corresponding RFID tag(s) 110, 120 of the corresponding electrode(s) and receiving information from the RFID tag(s) 110, 120 with respect to any change in current going through the cathode. The RFID reader(s) 144, 146 can then transmit the information about the change in current to the controller 130. As described below, the controller 130 can make decisions based on, e.g., the amount of change of the current.

The memory 134 is non-transitory and may be one or more of readily available memory such as random access memory (RAM), read only memory (ROM), or any other form of digital storage, local or remote. The memory 134 contains instructions, that when executed by the at least one processor 132, facilitates one or more operations of processes described herein (e.g., operations of process 350). The instructions in the memory 134 are in the form of a program product such as a program that implements the method of the present disclosure. The program code of the program product may conform to any one of a number of different programming languages.

Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure. In one example, the disclosure may be implemented as the program product stored on a computer-readable storage media (e.g., memory 134) for use with a computer system (not shown). The program(s) of the program product define functions of the disclosure, described herein.

Aspects described herein can be utilized with, or otherwise incorporated into, various devices utilizing energy storage devices, e.g., batteries, such as automobiles, other land vehicles (trucks), trains, aircraft, watercraft, satellite systems. In at least one aspect, the battery 150 can be electrically coupled to any suitable article 151, or one or more components of the article, that is or can be operated by an energy storage device. Illustrative, but non-limiting, examples of such articles can be a land vehicle, an aircraft, a watercraft, a spacecraft, a satellite, light emitting diode, consumer electronics (such as antennas, car radios, mobile phones, watches, and telecommunications base stations), a motor, a wind turbine, a bridge, a building, a pipeline, or components thereof.

In some aspects, continuous utilization of the RFID tag and RFID reader, coupled to the controller 130, enables wireless monitoring that is real-time and/or continuous during operation, e.g., wireless in operando monitoring. Here, for example, the RFID reader sends and receives signals to and from the RFID tag, as well as to and from the controller 130, continuously, enabling continuous monitoring during operation. Additionally, or alternatively, and in at least one aspect, the RFID reader sends and receives signals to and from the RFID tag periodically as well as to and from the controller 130 periodically, such that the electrode is monitored periodically, e.g., wireless in situ monitoring, such as for scheduled maintenance.

In at least one aspect, a periodic system of monitoring the structural health (e.g., damage) of an electrode over a monitored area can include data storage instead of a full data processing system. The data may include information on, damage, and if a discontinuity develops, the current or current change indicates that something has happened to the part. Here, the data can be retrieved periodically and processed at a maintenance depot or facility. In at least one aspect, the periodic system of monitoring can include no data collection during operation of the battery 150 (e.g., operation of a battery to power portions of an automobile during driving), and then the battery 150 can be coupled to the controller 130 (via the RFID tag/RFID reader) at a maintenance depot or facility for data collection. Such a periodic system can enable collection of data off-line.

The anode 105 can include a composite material that includes anode active material (e.g., graphite, silicon, a porous material that matches or substantially matches the potential of the given cathode material, natural graphite, artificial graphite, activated carbon, carbon black, high-performance powdered graphene, etc., and combinations thereof) particles in, e.g., a three-dimensional cross-linked network of carbon nanotubes.

The cathode 101 can include a composite material that includes cathode active material (e.g., lithium metal oxide, lithium metal, etc.) particles in, e.g., a three-dimensional cross-linked network of carbon nanotubes. According to some aspects, the three-dimensional cross-linked network of carbon nanotubes can have a webbed morphology, a non-woven, non-regular, or non-systematic morphology, or combinations thereof.

Metals in lithium metal oxides according to the present disclosure may include, but are not limited to, one or more alkali metals, alkaline earth metals, transition metals, aluminum, or post-transition metals, and hydrates thereof. Non-limiting examples of lithium metal oxides include lithiated oxides of Ni, Mn, Co, Al, Mg, Ti, alloys thereof, or combinations thereof. In an illustrative example, the lithium metal oxide is lithium nickel manganese cobalt oxide (LiNi$_x$Mn$_y$Co$_z$O$_2$, x+y+z=1), Li(Ni,Mn,Co)O$_2$, or Li—Ni—Mn—Co—O. The lithium metal oxide powders can have a particle size defined within a range between about 1 nanometer (nm) and about 100 microns (μm), or any integer or subrange in between. In a non-limiting example, the lithium metal oxide particles have an average particle size of about 1 μm to about 10 μm. In some aspects, an active material for the cathode can include LiFePO$_4$, LiCoO$_2$, Li—Ni—Mn—Co—O, or combinations thereof; and/or an active material for the anode can include Si, SiOx/C, graphite, or combinations thereof.

Any suitable materials can be used for the nanotube network 103a, 103b such as carbon nanotubes. The carbon nanotubes can be doped or non-doped. The carbon nanotubes can be single-walled nanotubes, few-walled nanotubes, and/or multi-walled nanotubes. In some aspects, the carbon nanotubes are single-walled nanotubes. Single-walled carbon nanotubes can be synthesized by known methods. Few-walled nanotubes and multi-walled nanotubes may be synthesized, characterized, co-deposited, and collected using any suitable method and apparatus known, including those used for single-walled nanotubes. The carbon nanotubes may range in length from about 50 nm to about 10 cm or greater, though longer or shorter carbon nanotubes are contemplated. In some aspects, a nanotube concentration in the composite material is about 0.5 wt % or more and/or about 10 wt % or less, such as from about 0.75 wt % to about 8 wt %, such as from about 1 wt % to about 5 wt %, such as from about 2 wt % to about 4 wt %, such as from about 2.5 wt % to about 3.5 wt %. Higher or lower concentrations are contemplated.

Suitable materials useful for the separator 109 include those known to persons of ordinary skill in the art for use in between battery anodes and cathodes, to provide a barrier between the anode and the cathode while enabling the exchange of lithium ions from one side to the other, such as a membranous barrier or a separator membrane. Suitable materials that can be used for the separator 109 include, but are not limited to, polymers such as polypropylene, polyethylene and composites of them, as well as PTFE. The separator membrane is permeable to lithium ions, allowing them to travel from the cathode side to the anode side and back during the charge-discharge cycle. But the separator membrane is impermeable to anode and cathode materials, preventing them from mixing, touching, and shorting the battery. The separator membrane can also serve as an electrical insulator for metal parts of the battery (leads, tabs, metal parts of the enclosure, etc.) preventing them from touching and shorting. The separator membrane can also prevent flow of the electrolyte.

In some aspects, the separator 109 is a thin (about 15-25 μm) polymer membrane (tri-layer composite: polypropylene-polyethylene-polypropylene, commercially available) between two relatively thick (about 20-1000 μm) porous electrode sheets. The thin polymer membrane may be about 15-25 μm thick, such as 15-23, 15-21, 15-20, 15-18, 15-16, 16-25, 16-23, 16-21, 16-20, 16-18, 18-25, 18-23, 18-21, 18-20, 20-25, 20-23, 20-21, 21-25, 21-23, 23-25, 15, 16, 17, 18, 19, 20, 21, 22, 23, 24, or 25 μm thick, or any integer or subrange in between. The two relatively thick porous electrode sheets may each independently be 50-500 μm thick, such as 50-450 μm, 50-400 μm, 50-350 μm, 50-300 μm, 50-250 μm, 50-200 μm, 50-150 μm, 50-100 μm, 50-75 μm, 50-60 μm, 50-55 μm, 55-500 μm, 55-450 μm, 55-400 μm, 55-350 μm, 55-300 μm, 55-250 μm, 55-200 μm, 55-150 μm, 55-100 μm, 55-75 μm, 55-60 μm, 60-500 μm, 60-450 μm, 60-400 μm, 60-350 μm, 60-300 μm, 60-250 μm, 60-200 μm, 60-150 μm, 60-100 μm, 60-75 μm, 75-500 μm, 75-450 μm, 75-400 μm, 75-350 μm, 75-300 μm, 75-250 μm, 75-200 μm, 75-150 μm, 75-100 μm, 100-500 μm, 100-450 μm, 100-400 μm, 100-350 μm, 100-300 μm, 100-250 μm, 100-200 μm, 100-150 μm, 150-500 μm, 150-450 μm, 150-400 μm, 150-350 μm, 150-300 μm, 150-250 μm, 150-200 μm, 200-500 μm, 200-450 μm, 200-400 μm, 200-350 μm, 200-300 μm, 200-250 μm, 250-500 μm, 250-450 μm, 250-400 μm, 250-350 μm, 250-300 μm, 300-500 μm, 300-450 μm, 300-400 μm, 300-350 μm, 350-500 μm, 350-450 μm, 350-400 μm, 400-500 μm, 400-450 μm, 450-500 μm, 50 μm, 55 μm, 60 μm, 75 μm, 100 μm, 150 μm, 200 μm, 250 μm, 300 μm, 350 μm, 400 μm, 450 μm, or 500 μm, or any integer or subrange in between.

The electrolyte 107 can be a liquid electrolyte, a gel electrolyte, or a combination thereof. The electrolyte 107 can include one or more polymers and/or lithium based materials. Illustrative, but non-limiting, examples of electrolytes and components of electrolytes include poly(ethylene oxide) (PEO), poly(propylene oxide)(PPO), poly(vinyl alcohol) (PVA), poly(vinylidene fluoride) (PVDF), poly(acrylonitrile) (PAN), poly(vinyl chloride) (PVC), poly(methyl methacrylate) (PMMA), hexafluoropropylene (HFP), and poly(ethyl α-cyanoacrylate) (PECA); monomers or polymers of ethylene carbonate (EC), propylene carbonate, dimethyl carbonate (DMC), diethylcarbonate (DEC), dimethylformamide (DMF), dimethylsulfoxide (DMSO), butyrolactone (BL), gamma-butyrolactone (γ-BL), and 2-methyl oxazoline; and lithium-based materials such as LiClO$_4$, LiCF$_3$SO$_3$, LiBF$_4$, and LiN(CF$_3$SO$_2$)$_2$. Combinations of the aforementioned materials, as well as copolymers of the aforementioned materials, can be used. Examples of polymer gel electrolytes that can be used include PAN-EC/PC/DMF-LiClO$_4$, PMMA-EC/PC-LiClO$_4$, PAN-EC/PC-LiClO$_4$, PVC-EC/PC-LiClO$_4$, PAN-EC/PC-LiCF$_3$SO$_3$, PAN-EC/DEC-LiClO$_4$, PVDF-EC/PC-LiBF$_4$, PVDF-HFP-EC/DEC-LiN(CF$_3$SO$_2$)$_2$, PMMA-EC/PC/γ-BL-LiCF$_3$SO$_3$, and PMMA-EC/DMC-LiN(CF$_3$SO$_2$)$_2$.

The RFID system utilized herein includes RFID tags, also called RFID labels, attached or embedded within the electrode to be identified. Two-way radio transmitter receivers, also known as RFID readers or RFID interrogators, send a signal to the RFID tags and read their responses.

The RFID tag(s) 110, 120 are coupled, physically and/or inductively, to at least a portion of the corresponding electrode(s), e.g., the cathode 101 and/or the anode 105. The current going through the electrode(s) induces a magnetic field in the RFID tag(s) 110, 120. The RFID tag(s) 110, 120 can be passive tags powered by energy from the corresponding RFID reader(s) 144, 146 interrogating radio waves, though active or battery-assistive passive tags are contemplated. The RFID tag(s) 110, 120 can be made of three elements—a substrate, a microchip, and an antenna. The microchip can be an integrated circuit which stores and process information and modulates and demodulated radio frequency. The antenna is used for, e.g., receiving and transmitting a signal. The RFID tag(s) 110, 120 can include a metal or a combination of metals. The metals may be in the form of an ink. Non-limiting examples of metals include Cu, Al, conductive ink, etc. RFID tag(s) 110, 120 can optionally include a nanotube network such as those described above. The metal, metal alloy, or combination thereof (and optionally nanotube networks) can be in the form of a yarn or thread configured as coils. A higher number of coils can increase the sensitivity of the RFID tag(s) 110, 120.

The RFID tag information can be stored in a non-volatile memory. The RFID tag(s) 110, 120 can be operable to, or configured to, receive a message from the RFID reader(s) 144, 146 and then respond with a signal such as its identification and other information. Since the RFID tag(s) 110, 120 can have unique serial numbers, the RFID reader(s) 144, 146 can discriminate among several tags that may be within the range of the RFID reader(s) 144, 146 and read them simultaneously.

The RFID reader(s) 144, 146 (also called RFID interrogators) can be made of three elements—a substrate, a microchip, and an antenna. In some aspects, the RFID reader(s) 144, 146 can include a conductive material such as a metal or a combination of metals. The metals may be in the form of an ink. Non-limiting examples of metals include Cu, Al, conductive ink, etc. The metal(s) can be in the form of a conductive yarn or conductive thread configured as coils. A higher number of coils can increase the sensitivity of the RFID reader(s) 144, 146. In some non-limiting examples, the conductive material can be Cu, Al, and combinations thereof. For example, the RFID reader used to interrogate the RFID tag of the anode can include Al and/or the RFID reader used to interrogate the RFID tag of the cathode can include Cu.

The RFID reader(s) 144, 146 can be passive or active. The RFID reader(s) 144, 146 can be fixed where each reader is, individually, set up to create a specific interrogation zone. The RFID reader(s) 144, 146 can be mobile readers that may be hand-held or mounted on a moveable element such as a vehicle or a cart. Signaling between the RFID tag(s) 110, 120 and the corresponding RFID reader(s) 144, 146 can be performed according to known methods.

In some examples, the conductive yarn/thread of the RFID reader(s) 144, 146 is a conductive yarn/thread as disclosed in U.S. patent application Ser. No. 16/446,389, which is hereby incorporated by reference herein in its entirety. In some aspects, the conductive yarns or threads of the RFID reader(s) 144, 146 include a non-conductive or less conductive substrate which is coated, embedded, and/or impregnated with electrically conductive elements, such as carbon, nickel, copper, gold, silver, titanium, or conductive polymers (e.g., polythiophenes such as poly(3,4-ethylenedioxythiophene) (PEDOT); polyanilines; polypyrroles; polyacetylenes; polystyrenesulfonates; or combinations thereof). The conductive polymers can be doped, with, e.g., dinonylnaphthalene sulfonic acid (DNNSA), dodecylbenzene sulfonic acid, camphorsulfonic acid, dibutylnaphthalene sulfonic acid, polystyrene sulfonic acid, or combinations thereof.

Metals and/or carbon can be applied to the non-conductive or less conductive substrate by any suitable technique such as chemical deposition, physical vapor deposition, and/or printed with conductive nanoparticle inks. Illustrative, but non-limiting, examples of the non-conductive or less conductive substrate include cotton, nylon, polyesters, polyamides, polyethylenes, polyphenylene benzobisoxazoles (PBO), and combinations thereof.

Example conductive yarns/threads for the RFID reader(s) 144, 146 include, but are not limited to, copper-coated polyethylene, aluminum-coated polyethylene, silver-coated polyethylene, gold-coated polyethylene, copper-coated polyamides, aluminum-coated polyamides, silver-coated polyamides, gold-coated polyamides, conductive carbon fibers, conductive stainless steel fiber.

The present disclosure also generally relates to processes for monitoring the structural health (e.g., damage) of an energy storage device and/or a component thereof, e.g., an electrode. As described above, the device includes a computing system or controller (e.g., controller 130). The computing system or controller includes a processor and a memory including computer readable instructions. The computing system or controller is utilized with the RFID reader(s) and the RFID tag(s) to wirelessly monitor the health of the energy storage device and electrode(s) thereof due to e.g., damage of the nanotube network. Briefly, the processor of the computing system or controller is configured to, based on execution of the computer readable instructions, receive an indication from the RFID reader(s) that the application program has started and receive data from the RFID reader(s). For example, the RFID reader(s) provide information about the health of the electrode(s) during use. The processor is further configured to analyze data from the RFID reader(s) 144/146, and make a decision based on, e.g., the data. The processor can be further configured to transmit this data. Accordingly, and in certain aspects, transmitters and/or antennae can be a part of the controller to transmit signals to another processor. Embodiments described herein enable real-time and/or in operando monitoring of the health of the energy storage device wirelessly.

Figure 3A:
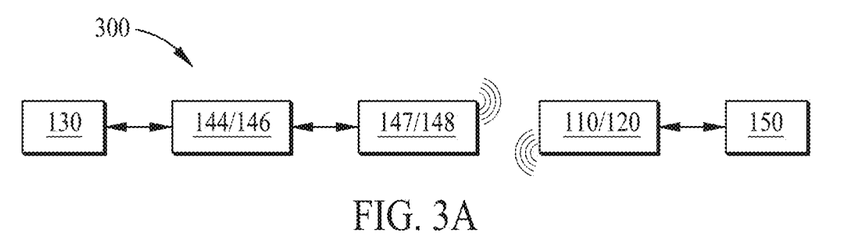
FIG. 3A is a general schematic for the operando, wireless monitoring of the health of an energy storage device according to at least one aspect of the present disclosure.

FIG. 3A is a general schematic of a process 300 for the operando, wireless monitoring of the health of an energy storage device according to at least one aspect of the present disclosure. The RFID tag(s) 110, 120 detect, e.g., a current, going through the electrode(s) of the battery 150. This current induces a magnetic field in the RFID tag(s) 110, 120 and the magnetic field can be read by the RFID reader(s) 144, 146 via antenna(s) 147, 148. The RFID reader(s) 144, 146 communicate information with the controller 130 (or computing system). The controller 130 then makes decisions based on the information.

Figure 3B:
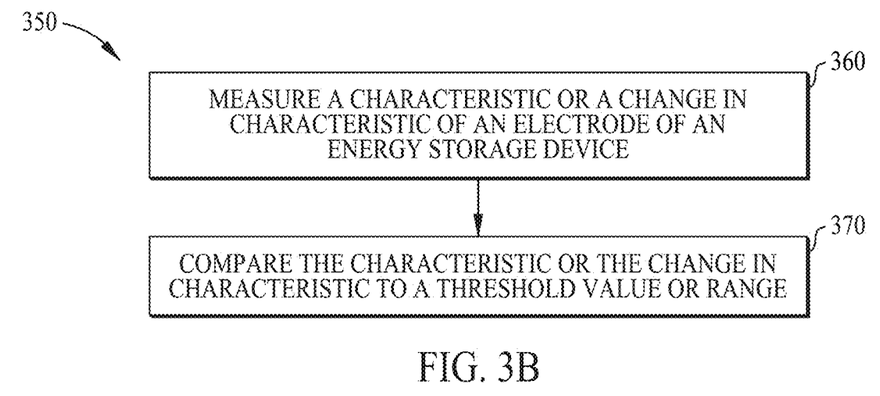
FIG. 3B is a flowchart showing selected operations of an example process for wirelessly monitoring the structural health (e.g., damage) of an energy storage device according to at least one aspect of the present disclosure.

FIG. 3B is a flowchart showing selected operations of a process 350 for wirelessly monitoring the structural health (e.g., damage) of an energy storage device and/or an electrode thereof according to at least one aspect of the present disclosure. In some examples, a characteristic of the electrode and/or the energy storage device, such as a current, a current change, a potential, a potential change, a voltage, a voltage change, a resistance, and/or a resistance change, can be measured, monitored, determined, or otherwise detected, via the induced magnetic field in the RFID tag(s). The operations of process 350 enable, e.g., operando monitoring.

For measurements where, e.g., the characteristic shown in FIG. 3B is current, a current or current change can be measured, monitored, determined, or otherwise detected. To begin, a current is established between the anode 105 and the cathode 101 as a battery, and the current induces a magnetic field in the RFID tag(s) 110, 120 located on or embedded within the corresponding electrodes. At operation 360, the current or the current change is measured indirectly via the induced magnetic field or change in the induced magnetic field of the RFID tag(s) 110, 120.

Operation 360 includes various actions including transmitting signals or other information between the RFID tag(s) 110, 120 and the corresponding RFID reader(s) 144/146 and/or transmitting signals or other information between the RFID reader(s) 144/146 and the controller 130. Actions prior to operation 360 can include the controller (or processor thereof) receiving an indication from the RFID reader(s) 144/146 that the application program for wirelessly or remotely monitoring the health of the energy storage device has started.

At operation 370, the current or current change I is compared to a threshold value of the characteristic (e.g., $I_{th}$).

The threshold value $I_{th}$ can be a specific value or a range of values determined based on normal operation data of a battery. Normal operation data can be reference data collected for normal (or proper) battery operation. In some aspects, and when a flexible electrode is utilized, the normal operation data can include normal bending, stretching, and/or twisting. The threshold value $I_{th}$ can be a data set stored on a memory device, such as the memory 134. The threshold value $I_{th}$ can correspond to a state of structural health of the battery 150.

To determine if the measured current or current change is indicative of damage to an electrode of the battery 150, the measured current or current change can be compared to the threshold current value or range, or threshold current change value or range, respectively. Damage to the electrode can be indicated when the detected current (or current change) passes, exceeds, falls below, or falls outside of, a threshold current (or current change) value or threshold current (or current change) range.

As a non-limiting example, if the measured current or current change ($I_m$) is determined to be less than the threshold value $I_{th}$ (indicating that the battery is operating normally), operation of the battery 150 can be continued. Here, the controller 130 can send a signal to an input/output device, such as a display unit or an audio device indicating that the battery 150 can be utilized. If the measured current or current change $I_m$ of the battery 150 is determined to be greater than or equal to the threshold value ($I_m \geq I_{th}$), the controller 130 sends a warning to an input/output device, such as a display unit or an audio device. The warning indicates that an action is to be performed on the battery. Operations 360 and 370 can be repeated for a predetermined time period or for a predetermined number of determination cycles, e.g., second, third, or nth iterations.

An example of the action performed of operation 370 can include shutting off an article 151 that uses the battery 150. For example, the article 151 can be caused to stop receiving power from the battery 150. Another example of the action performed of operation 370 can include removing the battery 150 from use. Here, this action can further include replacing the battery 150 with a different battery such that $I_m$ of the new battery becomes less than the threshold value $I_{th}$. The current or current change of the new battery can be determined at a new time iteration. The process 350 can repeat for a predetermined time period or for a predetermined number of determination cycles.

As another example of an action performed at operation 370, and after the article 151 has been caused to stop receiving power from the battery 150, the article 151 can be caused to receive power from the battery in order to re-check (or validate) the measurement. Other illustrative, but non-limiting, examples of the action performed of operation 370 can include performing maintenance on the energy storage device (e.g., battery 150) and/or electrode, inspecting the energy storage device and/or electrode, ordering an energy storage device, electrode, and/or a component thereof, replacing the energy storage device, electrode, and/or portion thereof. Additionally, or alternatively, the example process 350 can include a system that incorporates a contacting system to, e.g., contact a user, a driver, a maintenance office, and the like, that an inspection is needed on the energy storage device and/or the electrode. One or more of these illustrative actions, and others, can be performed at operation 370.

Figure 4:
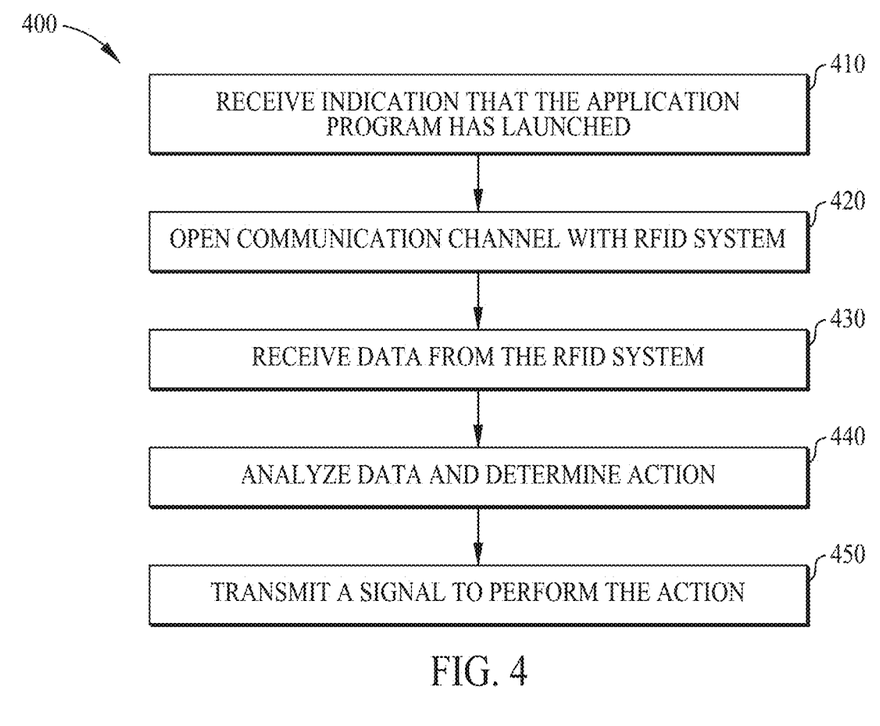
FIG. 4 is a flowchart showing selected operations of an example process for wirelessly monitoring the structural health (e.g., damage) of an energy storage device according to at least one aspect of the present disclosure.

FIG. 4 is a flowchart showing selected operations of an example process 400 for wirelessly monitoring the structural health (e.g., damage) of an energy storage device according to at least one aspect of the present disclosure. Specifically, the process 400 includes receiving data via an RFID system, e.g., the RFID tag(s) and RFID reader(s), regarding the health of the energy storage device, determining an action based on that data, and transmitting a signal to, e.g., a user, an article coupled to the energy storage device, or both, among others. The data can be a parameter related to the health of the energy storage device such as current, potential, resistance, changes thereof, or combinations thereof. The operations of process 400 enable, e.g., operando monitoring.

Process 400 can be performed by one or more processors. For example, controller 130 includes at least one processor 132 that can perform one or more operations of the process 400. Additionally, each of the RFID tag(s) 110, 120 and the RFID reader(s) 144, 146 can, individually, include one or more processors that can perform one or more operations of process 400.

Process 400 begins at operation 410 where a processor (e.g., processor(s) 132) receives an indication that the application program launched. At operation 420, the processor(s) 132 opens a communication channel with the RFID system—the one or more RFID reader(s) 144, 146 and the corresponding RFID tag(s) 110, 120. In some examples, the communication channel is a user datagram protocol (UDP) connection between the processor(s) and the sensor. In other examples, the communication channel is a transmission control protocol (TCP) connection, and internet protocol (IP) connection or various other communication or data transfer protocols.

At operation 430, the at least one processor 132 receives data, e.g., data on the health of the energy storage device, from the RFID reader(s) 144, 146 of the RFID system over the established communication channel. In general, data is of a format associated with the specific RFID reader(s) 144, 146. That is, each RFID reader transmits a signal (e.g., data) in a format unique to that RFID reader. Prior to the processor 132 receiving this data from the RFID system, the RFID reader receives a signal/data from the RFID tag. Each RFID tag transmits a signal in a format unique to the RFID tag/reader combination. At operation 440, the at least one processor 132 analyzes the data and makes a determination as to an action (such as those actions described with respect to operation 370), e.g., maintenance and/or an action of the article 151 drawing power from the energy storage device, e.g., stopping use or continuing use of the energy storage device (or battery 150). At operation 450, the at least one processor 132 transmits a signal to an appropriate location such as a user, the energy storage device (or battery 150), the article 151 drawing power, an input/output device, a maintenance facility, etc., to perform the action determined in operation 440.

For example, a signal can be sent to an input/output device, such as a display unit or an audio device indicating that the battery 150 can be utilized. If the measured current or current change $I_m$ of the battery 150 is determined to be greater than or equal to the threshold value ($I_m \geq I_{th}$), the controller 130 sends a warning to an input/output device, such as a display unit or an audio device. The warning indicates that an action is to be performed on the battery 150.

An example of the action performed of operation 450 can include shutting off an article 151 that uses the battery 150. For example, the article 151 can be caused to stop receiving power from the battery 150. Another example of the action performed of operation 450 can include removing the battery 150 from use. Here, this action can further include replacing the battery 150 with a different battery such that $I_m$ of the new battery becomes less than the threshold value $I_{th}$.

The current or current change of the new battery can be determined at a new time iteration. The process 400 can repeat for a predetermined time period or for a predetermined number of determination cycles.

As another example of an action performed at operation 450, and after the article 151 has been caused to stop receiving power from the battery 150, the article 151 can be caused to receive power from the battery in order to re-check (or validate) the measurement. Other illustrative, but non-limiting, examples of the action performed of operation 450 can include performing maintenance on the energy storage device (e.g., battery 150) and/or electrode, inspecting the energy storage device and/or electrode, ordering an energy storage device, electrode, and/or a component thereof, replacing the energy storage device, electrode, and/or portion thereof. Additionally, or alternatively, operation 450 can include a system that incorporates a contacting system to, e.g., contact a user, a driver, a maintenance office, and the like, that an inspection is needed on the energy storage device and/or the electrode. One or more of these illustrative actions, and others, can be performed at operation 450.

In general, process 400 represents a process for receiving data from a single RFID reader and causing an action based on the data. However, process 400 may be extended to support receiving data from multiple RFID readers, by opening a communication channel for each RFID reader. Then, the processor(s) perform process 400 for each RFID reader in parallel.

In some embodiments, one or more operations of the apparatus 100, one or more operations of process 300, one or more operations of process 350, and/or one or more operations of process 400 described herein can be implemented using a programmable logic controller (PLC) and/or can be included as instructions in a computer-readable medium for execution by a control unit (e.g., controller 130 and/or the at least one processor 132) or any other processing system or any other processor, e.g., those processors that are part of the RFID tag(s) and/or RFID reader(s). The computer-readable medium can include any suitable memory for storing instructions, such as read-only memory (ROM), random access memory (RAM), flash memory, an electrically erasable programmable ROM (EEPROM), a compact disc ROM (CD-ROM), a floppy disk, punched cards, magnetic tape, and the like.

One or more operations of process 300, process 350, and/or process 400 can be used with the another process. For example, operations 360 and/or 370 of process 350 can be a portion of the process 400.

The energy storage devices and the processes described herein can enable wireless, automatic, continuous (and/or periodic) monitoring of the structural health of energy storage devices and electrodes. Any damage can be detected in order to ensure the structural integrity of the energy storage device, electrode, or other component. The energy storage devices with wireless structural health monitoring described herein are suitable for integration in an existing production process for an energy storage device and enables self-diagnosis. In addition, the energy storage devices and processes described herein can enable detection of damage that can be hidden under a surface of the energy storage device.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (e.g. amounts, dimensions, etc.) but some experimental errors and deviations should be accounted for.

Example Self Standing Electrode

Figure 5:
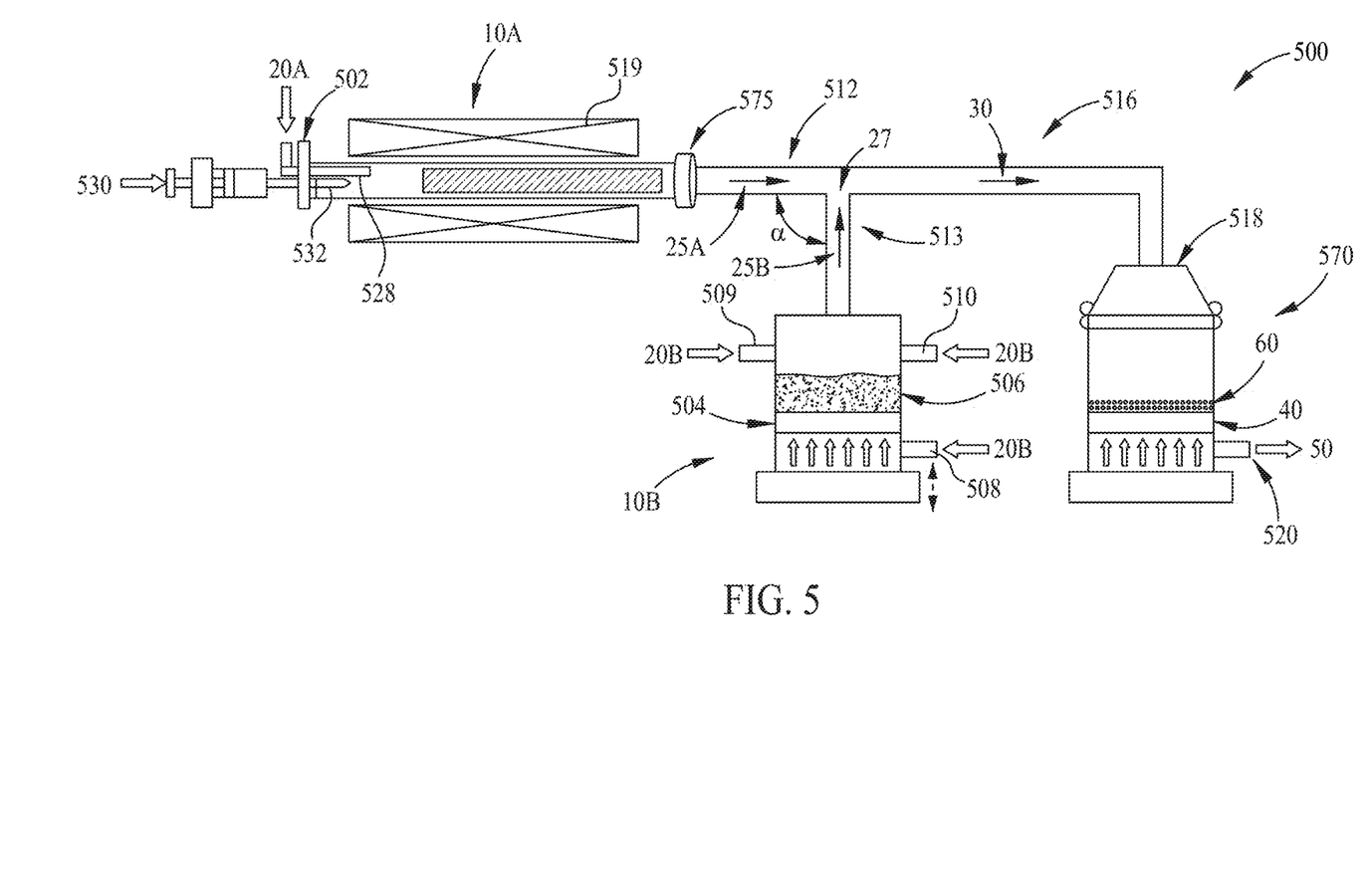
FIG. 5 is a schematic view of an example apparatus for making a self-standing electrode according to at least one aspect of the present disclosure.

An example self-standing electrode that can be utilized with apparatus and processes described herein was produced according to U.S. Pat. No. 10,658,651, which is incorporated herein by reference in its entirety. A quartz tube having dimensions of 25 mm OD×22 mm ID×760 mm length was used as the carbon nanotube reactor 10A for the apparatus 500 (FIG. 5). The carbon nanotube reactor 10A was aligned horizontally with a left end closed with a barrier 502. However, the carbon nanotube reactor 10A could be aligned vertically or at any angle (a) therebetween. At the center of barrier 502, a carrier gas inlet 528 was provided for the carrier gas 20A and a catalyst/catalyst precursor inlet 532 was provided for the catalyst/catalyst precursor 530. Both the carrier gas inlet 528 and the catalyst/catalyst precursor inlet 532 were positioned to the left of the section of the carbon nanotube reactor 10A heated by the heat source 519.

The carbon nanotube reactor 10A was heated to a temperature of about 1300° C. The carrier gas 20A included a mixture of about 850 sccm argon (Ar) and about 300 sccm $H_2$ and was provided to the carbon nanotube reactor 10A via the carrier gas inlet 528. The catalyst/catalyst precursor 530 composition was ~80% ethanol, ~20% methanol, ~0.18% ferrocene, and ~0.375% thiophene. The ethanol functioned both as a solvent for the ferrocene and as the carbon source for growing the nanotubes. The catalyst/catalyst precursor 530 solution was injected at a rate of about 0.3 mL/min via the catalyst/catalyst precursor inlet 532 into the reactor carbon nanotube growth zone, where the ferrocene decomposed to iron catalyst particles and the ethanol was converted to a carbon source for the growth of single-walled nanotubes on the iron catalysts. The carrier gas 20A transported the single-walled nanotubes through reactor outlet 575 and into tube 512 as the first aerosolized stream 25A.

Lithium nickel manganese cobalt oxide ($LiNiMnCoO_2$) particles were used as the electrode active material 506 and were loaded into aerosolizing chamber 10B on a porous frit 507 to a height of about 5 mm, loading about 50 g. The carrier/aerosolizing gas 20B, Ar, was provided at a rate of about 2 L/min Ar through the porous frit 507 via inlet 508 (~1 L/min; bottom up) and inlets 509, 510 (~1 L/min; tangential flows) in combination. Aerosolized suspended $LiNiMnCoO_2$ exits aerosolizing chamber 10B as the second aerosolized stream 25B via tube 513 and combines with the first aerosolized stream 25A comprising the synthesized carbon nanotubes traveling through tube 512 at the junction 27, forming a mixture 30 of aerosolized, suspended $LiNiMnCoO_2$ and carbon nanotubes in the carrier gases. The mixture 30 travels through tube 516 into collection chamber 570 via an inlet 518. The mixture 30 of $LiNiMnCoO_2$ and carbon nanotubes deposits on the porous substrate 40, in this case a porous frit, as a composite self-standing electrode 60, as the carrier gases 50 pass through the porous substrate 40 and out an exhaust 520.

Two composite self-standing electrodes 60 were collected from the porous substrate that included about 0.8 wt % single-walled carbon nanotubes and the balance $LiNiMnCoO_2$ particles. The self-standing electrode was then treated to increase the density by pressing (7 ton), to afford a treated self-standing electrode. The composite self-standing electrodes 60 are flexible and allow for bending. The composite self-standing electrodes are characterized as having a carbon nanotube web surrounding the $LiNiMnCoO_2$ particles to retain the $LiNiMnCoO_2$ particles therein without the use of a binder or current collector foils.

Figure 6A:
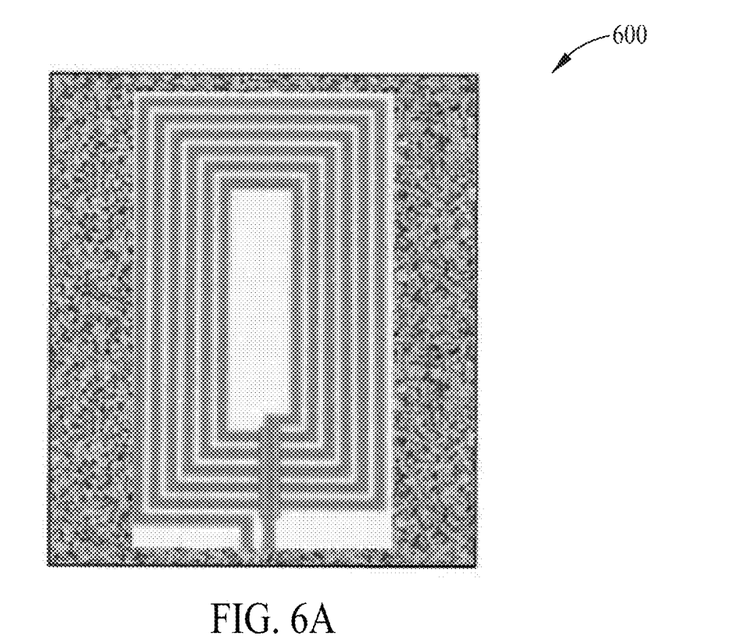
FIG. 6A is an exemplary photograph of an radio frequency identification (RFID) tag used with an electrode of an energy storage device according at least one aspect of the present disclosure.
Figure 6B:
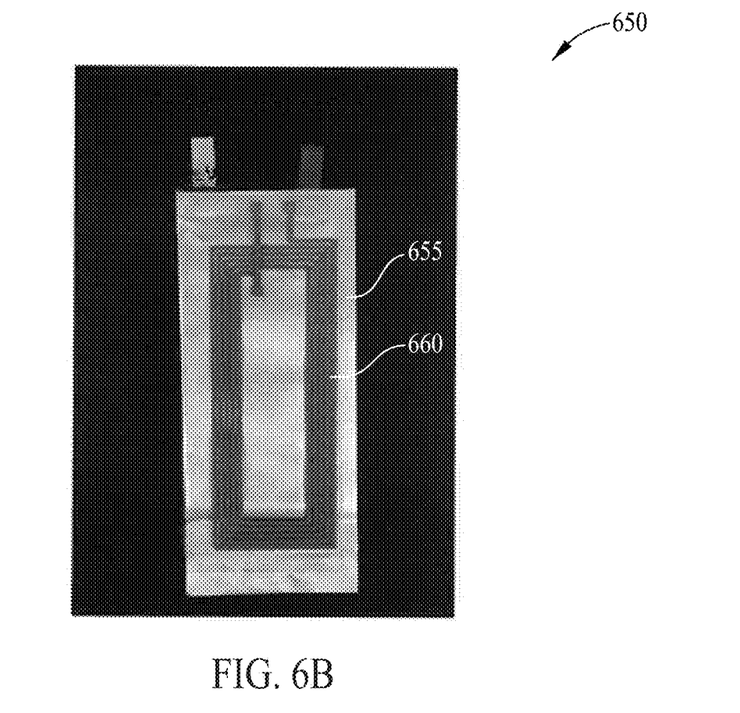
FIG. 6B is an exemplary photograph of an example battery and an RFID reader according at least one aspect of the present disclosure.

FIG. 6A is an exemplary photograph of an RFID tag 600 that can be used with an electrode of an energy storage device, e.g., a battery. FIG. 6B is an exemplary photograph 650 of an example energy storage device 655 and an RFID reader 660. As shown, the energy storage device 655 is a flexible battery included within a pouch, and the RFID reader 660 is located external to the pouch housing the energy storage device 655.

The apparatus and processes described herein can provide non-destructive, real-time and wireless monitoring of energy storage devices, and be low cost, especially when measured against costs associated with the failure of electrodes and battery storage devices. Moreover, the diagnostic information provided by apparatus and processes described herein can, e.g., help engineers design an improved version of the electrodes and battery storage devices. In some aspects, the lack of, e.g., current collector metal foils of the flexible battery and the piezoresistance ability of the electrodes can enable real-time, operando monitoring of changes of electrodes' mechanical properties and the corresponding battery health. Currently there are no established prognostic methods for batteries to diagnose the degradation processes and determine the health of lithium-ion batteries in operando, wirelessly, and in the field. The ability to monitor the structural health of energy storage devices continuously, wirelessly, and during operation, as enabled by embodiments described herein, would not only improve the safety of the energy storage devices, but would also provide information on how to manufacture structurally durable energy storage devices and components thereof.

Aspects Listing

The present disclosure provides, among others, the following aspects, each of which can be considered as optionally including any alternate aspects:

Clause 1. An apparatus for wireless monitoring of an energy storage device, comprising:
an energy storage device comprising an electrode, the electrode comprising a nanotube network;
a radio-frequency identification (RFID) system comprising:
a RFID tag comprising a conductive material, the RFID tag attached to the electrode or embedded within the electrode; and
a RFID reader external to the energy storage device; and
one or more processors, wherein at least one processor is configured to:
determine a first value of current of the electrode of the energy storage device based on an induced magnetic field acting on the conductive material; and
compare the first value of current to a threshold value or range.

Clause 2. The apparatus of Clause 1, wherein the RFID reader further comprises an element to transmit or to receive a signal to the one or more processors.

Clause 3. The apparatus of Clause 1 or Clause 2, further comprising an article electrically coupled to the energy storage device, the article being a component of a land vehicle, an aircraft, a watercraft, a spacecraft, a satellite, a light emitting diode, a consumer electronic, a wind turbine, a building, a bridge, or a pipeline.

Clause 4. The apparatus of Clause 3, further comprising a memory including computer readable instructions, wherein the one or more processors is configured to, based on execution of the computer readable instructions:
receive an indication from a program application that the program application has started;
receive data from the RFID system, the data related to the current of the electrode;
analyze the data;
determine an action based on the data; and
transmit a signal to the article or a user for the article or user to perform the action.

Clause 5. The apparatus of Clause 3, wherein the one or more processors is further configured to cause the article to stop receiving power from the energy storage device when the first value of current is equal to or greater than the threshold value or range.

Clause 6. The apparatus of any one of Clauses 1-5, wherein, when the first value of current is determined to be less than the threshold value or range, the at least one processor is further configured to:
determine a second value of current; and
compare the second value of current to the threshold value or range.

Clause 7. The apparatus of any one of Clauses 1-6, wherein the electrode comprises a lithium storage active material.

Clause 8. The apparatus of any one of Clauses 1-7, wherein the energy storage device is a battery.

Clause 9. A process for wirelessly monitoring structural health of an energy storage device, comprising:
analyzing data from an RFID system coupled to an electrode of the energy storage device, the electrode comprising a nanotube network, the RFID system comprising:
a RFID tag comprising a conductive material, the RFID tag attached to the electrode or embedded within the electrode; and
a RFID reader external to the energy storage device;
determining an action based on the data; and
transmitting a signal transmit to an article electrically coupled to the energy storage device or to a user for the article or the user to perform the action.

Clause 10. The process of Clause 9, wherein, the analyzing data comprises:
determining a first value of a current of the electrode based on an induced magnetic field acting on the conductive material of the RFID tag; and
comparing the first value of current to a threshold value or range.

Clause 11. The process of Clause 10, wherein the first value of current indicates damage to the electrode when the first value of current is equal to or greater than the threshold value or range.

Clause 12. The process of Clause 10 or Clause 11, wherein, when the first value of current is equal to or greater than the threshold value or range, the action comprises one or more of performing maintenance on the energy storage device, inspecting the energy storage device, ordering a different energy storage device, or replacing the energy storage device.

Clause 13. The process of Clause 10, wherein the action comprises the article stopping use of the energy storage device when the first value of current is equal to or greater than the threshold value or range.

Clause 14. The process of Clause 13, wherein the action further comprises the article resuming use of the energy storage device after stopping use of the energy storage device to determine another value of current.

Clause 15. The process of Clause 10, wherein, when the first value of current is determined to be less than the threshold value or range, the analyzing data further comprises:

determining a second value of current; and comparing the second value of current to the threshold value or range.

Clause 16. The process of any one of Clauses 9-15, wherein the energy storage device is a battery.

Clause 17. A non-transitory computer-readable medium storing instructions that, when executed on a processor, perform operations for wirelessly monitoring structural health of an energy storage device, the operations comprising:

analyzing data from an RFID system coupled to an electrode of the energy storage device, the electrode comprising a nanotube network, the RFID system comprising:

a RFID tag comprising a conductive material, the RFID tag attached to the electrode or embedded within the electrode; and a RFID reader external to the energy storage device;

determining an action based on the data; and transmitting a signal transmit to an article electrically coupled to the energy storage device or to a user for the article or the user to perform the action.

Clause 18. The non-transitory computer-readable medium of Clause 17, wherein, the analyzing data comprises:

determining a first value of a current of the electrode based on an induced magnetic field acting on the conductive material of the RFID tag; and comparing the first value of current to a threshold value or range.

Clause 19. The non-transitory computer-readable medium of Clause 18, wherein the operations further comprise:

causing the article to stop receiving power from the energy storage device when the first value of current is equal to or greater than the threshold value or range;

causing the article to continue receiving power from the energy storage device to determine another value of current; or a combination thereof.

Clause 20. The non-transitory computer-readable medium of Clause 18, wherein, when the first value of current is less than the threshold value or range, the operations further comprise:

determining a second value of current; and comparing the second value of current to the threshold value or range.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "an electrode" include aspects comprising one, two, or more electrodes, unless specified to the contrary or the context clearly indicates only one electrode is included.

Various aspects of the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software module(s) stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Additionally, or alternatively, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless monitoring of an energy storage device, comprising:
    an energy storage device comprising an electrode, the electrode comprising a nanotube network configured to affect a resistance of the electrode, wherein a change in an arrangement of the nanotube network changes the resistance of the electrode;
    a radio-frequency identification (RFID) system comprising:
        a RFID tag comprising a conductive material, the RFID tag attached to the electrode or embedded within the electrode, wherein the RFID tag is configured to generate a magnetic field in response to a current in the electrode acting on the conductive material; and
        a RFID reader external to the energy storage device and configured to receive the magnetic field; and
    one or more processors, wherein at least one processor is configured to:
        determine a first value of the current of the electrode of the energy storage device based on the magnetic field; and
        compare the first value of current to a threshold value or range.

2. The apparatus of claim 1, wherein the RFID reader further comprises an element to transmit or to receive a signal to the one or more processors.

3. The apparatus of claim 1, further comprising an article electrically coupled to the energy storage device, the article being a component of a land vehicle, an aircraft, a watercraft, a spacecraft, a satellite, a light emitting diode, a consumer electronic, a wind turbine, a building, a bridge, or a pipeline.

4. The apparatus of claim 3, further comprising a memory including computer readable instructions, wherein the one or more processors is configured to, based on execution of the computer readable instructions:
    receive an indication from a program application that the program application has started;
    receive data from the RFID system, the data related to the current of the electrode;
    analyze the data;
    determine an action based on the data; and
    transmit a signal to the article or a user for the article or user to perform the action.

5. The apparatus of claim 3, wherein the one or more processors is further configured to cause the article to stop receiving power from the energy storage device when the first value of current is equal to or greater than the threshold value or range.

6. The apparatus of claim 1, wherein, when the first value of current is determined to be less than the threshold value or range, the at least one processor is further configured to:
    determine a second value of current; and
    compare the second value of current to the threshold value or range.

7. The apparatus of claim 1, wherein the electrode comprises a lithium storage active material.

8. The apparatus of claim 1, wherein the energy storage device is a battery.

9. A process for wirelessly monitoring structural health of an energy storage device, comprising:
    analyzing data from an RFID system coupled to an electrode of the energy storage device, the electrode comprising a nanotube network configured to affect a resistance of the electrode and the data related to a current in the electrode, wherein a change in an arrangement of the nanotube network changes the resistance of the electrode, the RFID system comprising:
        a RFID tag comprising a conductive material, the RFID tag attached to the electrode or embedded within the electrode, wherein the RFID tag is configured to generate a magnetic field in response to the current in the electrode acting on the conductive material; and
        a RFID reader external to the energy storage device and configured to receive the magnetic field;
    determining an action based on the data; and
    transmitting a signal transmit to an article electrically coupled to the energy storage device or to a user for the article or the user to perform the action.

10. The apparatus of claim 1, wherein the conductive material is configured as coils.

11. The apparatus of claim 1, wherein the electrode further comprises an active battery material, and the nanotube network is movable relative to the active battery material in response to the current.

12. The apparatus of claim 11, wherein the nanotube network has a concentration in the active material from 0.5 wt % to 10 wt %.

13. The apparatus of claim 1, wherein the change in the arrangement of the nanotube network comprises a change in an alignment or a contact point of the nanotube network.

14. The process of claim 9, wherein, the analyzing data comprises:
  determining a first value of the current of the electrode based the magnetic field; and
  comparing the first value of the current to a threshold value or range.

15. The process of claim 14, wherein the first value of current indicates damage to the electrode when the first value of current is equal to or greater than the threshold value or range.

16. The process of claim 14, wherein, when the first value of current is equal to or greater than the threshold value or range, the action comprises one or more of performing maintenance on the energy storage device, inspecting the energy storage device, ordering a different energy storage device, or replacing the energy storage device.

17. The process of claim 14, wherein the action comprises the article stopping use of the energy storage device when the first value of current is equal to or greater than the threshold value or range.

18. The process of claim 17, wherein the action further comprises the article resuming use of the energy storage device after stopping use of the energy storage device to determine another value of current.

19. The process of claim 14, wherein, when the first value of current is determined to be less than the threshold value or range, the analyzing data further comprises:
  determining a second value of current; and
  comparing the second value of current to the threshold value or range.

20. The process of claim 9, wherein the energy storage device is a battery.

21. A non-transitory computer-readable medium storing instructions that, when executed on a processor, perform operations for wirelessly monitoring structural health of an energy storage device, the operations comprising:
  analyzing data from an RFID system coupled to an electrode of the energy storage device, the electrode comprising a nanotube network configured to affect a resistance of the electrode and the data related to a current in the electrode, wherein a change in an arrangement of the nanotube network changes the resistance of the electrode, the RFID system comprising:
    a RFID tag comprising a conductive material, the RFID tag attached to the electrode or embedded within the electrode, wherein the RFID tag is configured to generate a magnetic field in response to the current in the electrode acting on the conductive material; and
    a RFID reader external to the energy storage device and configured to receive the magnetic field;
  determining an action based on the data; and
  transmitting a signal to an article electrically coupled to the energy storage device or to a user for the article or the user to perform the action.

22. The non-transitory computer-readable medium of claim 21, wherein, the analyzing data comprises:
  determining a first value of the current of the electrode based the magnetic field; and
  comparing the first value of the current to a threshold value or range.

23. The non-transitory computer-readable medium of claim 22, wherein the operations further comprise:
  causing the article to stop receiving power from the energy storage device when the first value of current is equal to or greater than the threshold value or range;
  causing the article to continue receiving power from the energy storage device to determine another value of current; or
  a combination thereof.

24. The non-transitory computer-readable medium of claim 22, wherein, when the first value of current is less than the threshold value or range, the operations further comprise:
  determining a second value of current; and
  comparing the second value of current to the threshold value or range.

25. An apparatus for wireless monitoring of an energy storage device, comprising:
  an energy storage device comprising an electrode, the electrode comprising an active battery material and a nanotube network configured to affect a resistance of the electrode;
  a radio-frequency identification (RFID) system comprising:
    a RFID tag comprising a conductive material, the RFID tag attached to the electrode or embedded within the electrode, wherein the RFID tag is configured to generate a magnetic field in response to a current in the electrode acting on the conductive material; and
    a RFID reader external to the energy storage device and configured to receive the magnetic field; and
  one or more processors, wherein at least one processor is configured to:
    determine a first value of the current of the electrode of the energy storage device based on the magnetic field; and
    compare the first value of current to a threshold value or range,
  wherein the nanotube network is movable relative to the active battery material in response to the current.

26. The apparatus of claim 25, wherein the RFID reader further comprises an element to transmit or to receive a signal to the one or more processors.

27. The apparatus of claim 25, further comprising an article electrically coupled to the energy storage device, the article being a component of a land vehicle, an aircraft, a watercraft, a spacecraft, a satellite, a light emitting diode, a consumer electronic, a wind turbine, a building, a bridge, or a pipeline.

28. The apparatus of claim 27, further comprising a memory including computer readable instructions, wherein the one or more processors is configured to, based on execution of the computer readable instructions:
  receive an indication from a program application that the program application has started;

receive data from the RFID system, the data related to the current of the electrode;
analyze the data;
determine an action based on the data; and
transmit a signal to the article or a user for the article or user to perform the action.

\* \* \* \* \*